( 12 ) United States Patent
Nohara et al.

(10) Patent No.: US 9,452,810 B2
(45) Date of Patent: Sep. 27, 2016

(54) ROLLING MOTION REDUCING APPARATUS FOR A SHIP

(71) Applicant: MITSUBISHI HEAVY INDUSTRIES, LTD., Tokyo (JP)

(72) Inventors: Tsuyoshi Nohara, Tokyo (JP); Hiroshi Takeuchi, Tokyo (JP); Katsuya Umemura, Tokyo (JP)

(73) Assignee: TOHMEI INDUSTRIES CO., LTD., Chita (JP)

( * ) Notice: Subject to any disclaimer, the term of this patent is extended or adjusted under 35 U.S.C. 154(b) by 0 days.

(21) Appl. No.: 13/978,993

(22) PCT Filed: Mar. 4, 2013

(86) PCT No.: PCT/JP2013/055887
§ 371 (c)(1),
(2) Date: Jul. 10, 2013

(87) PCT Pub. No.: WO2014/136192
PCT Pub. Date: Sep. 12, 2014

(65) Prior Publication Data
US 2014/0245939 A1    Sep. 4, 2014

(51) Int. Cl.
*B63B 39/00*    (2006.01)
*B63B 43/02*    (2006.01)
*B63B 39/04*    (2006.01)
*G01C 19/04*    (2006.01)

(52) U.S. Cl.
CPC .............. *B63B 39/04* (2013.01); *G01C 19/04* (2013.01); *Y10T 74/1257* (2015.01)

(58) Field of Classification Search
CPC ....... B63B 39/00; B63B 39/02; B63B 39/04; G01C 19/04; Y10T 74/1257
USPC ............ 114/121–124; 74/5 R, 5.1, 5.4–5.47, 74/5.22, 5.5
See application file for complete search history.

(56) References Cited

U.S. PATENT DOCUMENTS

| 2,202,162 | A | * | 5/1940 | Minorsky | ..................... | 114/122 |
| 3,395,667 | A | * | 8/1968 | Kohman | ....................... | 114/122 |
| 5,628,267 | A | | 5/1997 | Hoshio et al. | | |
| 6,973,847 | B2 | * | 12/2005 | Adams et al. | ................. | 74/5.47 |

(Continued)

FOREIGN PATENT DOCUMENTS

| JP | 7-215280 | 8/1995 |
| JP | 2000-304541 | 11/2000 |
| JP | 2007-183356 | 7/2007 |
| JP | 2010-256042 | 11/2010 |

OTHER PUBLICATIONS

Japanese Office Action issued Apr. 25, 2014 in corresponding Japanese Patent Application No. 2013-530261 with English translation.

(Continued)

*Primary Examiner* — Daniel V Venne
(74) *Attorney, Agent, or Firm* — Wenderoth, Lind & Ponack, L.L.P.

(57) ABSTRACT

A rolling motion reducing apparatus includes a flywheel, a gimbal, a gimbal supporting section, a damper and a lock mechanism. The gimbal rotatably supports the flywheel. The gimbal supporting section supports the gimbal 11 through a gimbal shaft such that the gimbal can rotate. The damper 13 brakes a rotational motion of the gimbal. The lock mechanism locks a rotational motion of the gimbal.

12 Claims, 5 Drawing Sheets

(56) References Cited

U.S. PATENT DOCUMENTS

| | | | |
|---|---|---|---|
| 7,240,630 B2* | 7/2007 | Akers | 114/122 |
| 7,458,329 B2* | 12/2008 | Nedwed | 114/122 |
| 2004/0244513 A1* | 12/2004 | Adams et al. | 74/5.47 |
| 2005/0274210 A1* | 12/2005 | Adams et al. | 74/5.4 |
| 2009/0114136 A1* | 5/2009 | Ayres | 114/122 |
| 2011/0030604 A1* | 2/2011 | Takeuchi et al. | 114/122 |

OTHER PUBLICATIONS

International Preliminary Report on Patentability and Written Opinion of the International Searching Authority issued Jun. 4, 2013 in International (PCT) Application No. PCT/JP2013/055887 with English translation.

* cited by examiner

ROLLING MOTION REDUCING APPARATUS FOR A SHIP

TECHNICAL FIELD

The present invention relates to a rolling motion reducing apparatus which suppressing a rolling motion and a ship using the same.

BACKGROUND ART

A rolling motion reducing apparatus is known, which reduces a rolling motion of a moving apparatus such as a ship. For example, Japanese patent publication JP Heisei 7-215280 A (corresponding to U.S. Pat. No. 5,628,267 A) discloses a ship oscillation suppression device and a ship. This ship oscillation suppression device has a control moment gyro (100). In the oscillation suppression device, a spin shaft (60) of a flywheel (1) of the gyro (100) is driven by a flat type spin motor (5) and is supported by a gimbal (2) through spin bearings (6). The gimbal (2) is supported by supports (8) through gympal shafts (3) and gimbal bearings (7). The oscillation of the gimbal shaft (3) is braked by disk brakes (30). The disk brake (30) includes a gimbal shaft connection fixing disk (9) and a support connection fixing disk (10). Or, the oscillation of the gimbal shaft (3) is braked by powder brakes (40) or oil dampers (11).

The above ship oscillation suppression device is an apparatus that, by supporting the flywheel which is rotating at high speed with the gimbal, when the gimbal is swung due to the rolling motion of the ship, the gyro torque (the counter torque) caused by the gyro effect is transmitted to the ship body, thereby reducing the rolling motion of the ship. In the above mentioned ship oscillation suppression device, the gyro torque is braked by braking the oscillation of the gimbal shafts with the braking devices such as the disk brakes, the powder brakes and the oil dampers.

With respect to the above rolling motion reducing apparatus, the inventors have now discovered the following facts. That is, in the above rotational motion reducing apparatus, the braking devices that brake the swinging motion of the gimbal shafts are provided. However, mechanisms that make the rolling motion reducing apparatus stop urgently in an emergency are not provided. In other words, in the case that the gimbal of the rolling motion reducing apparatus operates excessively, the braking devices are only mechanisms for suppressing the excessive gimbal operation. Therefore, for example, in the case that the braking device is in malfunction in which the braking device cannot fulfill its function due to the temperature increase, there is the potential that the gimbal is swung violently and the rolling motion reducing apparatus breaks down.

Furthermore, in the above rolling motion reducing apparatus, when the braking device is in malfunction, in order to make the rolling motion reducing apparatus stop urgently, it is necessary to turn off a power switch of the motor of the flywheel and wait for completely stopping of the flywheel. However, it takes long time to completely stop the flywheel. If the rolling motion reducing apparatus is left for a long time when the braking device is in malfunction, since the gimbal operates continuously for along time while the braking device still remain in malfunction, there is the potential for causing the braking device to break down.

Moreover, as a method of temporarily stopping the rolling motion reducing apparatus in order to confirm an effect of the rolling motion reducing apparatus installed in the ship on the sea, turning off the power switch of the motor is the only method. Then, after turning off the power switch, it is necessary to wait for completely stopping of the rolling motion reducing apparatus for a long time. However, since a situation of waves that the ship body receives may be varied, it is difficult to confirm the effect of the rolling motion reducing apparatus under an equivalent wave condition as an input to the ship body. In addition, it is difficult to experience the effect of the rolling motion reducing after a long time passing.

As the related technique, Japanese patent publication JP 2010-256042 A (corresponding to US patent publication US 2011030604 A1) discloses a rolling motion reducing apparatus for a ship. This rolling motion reducing apparatus for a ship includes a flywheel; a gimbal; a motor; a gimbal supporting section; a first damper; a motor driver; and a safety unit. The gimbal supports the flywheel rotatably. The motor drives the flywheel. The gimbal supporting section supports the gimbal such that the gimbal can rotate. The first damper brakes a rotational motion of the gimbal. The motor driver supplies driving power to the motor. The safety device makes the motor driver stop to the supply of driving power when a temperature of the first damper exceeds a predetermined temperature.

CITATION LIST

Patent Literature

[PTL 1] JP Heisei 7-215280 A
[PTL 2] JP 2010-256042 A

SUMMARY OF INVENTION

An object of the present invention is to provide a rolling motion reducing apparatus which can stop urgently in a short period of time and a ship using the same. Another object of the present invention is to provide a rolling motion reducing apparatus which can further improve its safety and a ship using the same. Still another object of the present invention is to provide a rolling motion reducing apparatus which can easily confirm its rolling motion reducing effect and a ship using the same.

A rolling motion reducing apparatus of the present invention includes: a flywheel; a gimbal; a gimbal supporting section; a damper; and a lock mechanism. The gimbal rotatably supports the flywheel. The gimbal supporting section supports the gimbal through a gimbal shaft such that the gimbal can rotate. The damper brakes a rotational motion of the gimbal. The lock mechanism locks a rotational motion of the gimbal.

In the rolling motion reducing apparatus, the lock mechanism may be provided so as to lock a rotational motion of the gimbal shaft. For example, in the rolling motion reducing apparatus, the lock mechanism may include a disk brake configured to lock a rotational motion of the gimbal shaft.

In the rolling motion reducing apparatus, the lock mechanism may be provided so as to lock a rotational motion of a main body of the gimbal. For example, in the rolling motion reducing apparatus, the lock mechanism may include an actuator configured to lock a rotational motion of the main body of the gimbal.

A ship of the present invention includes: a ship body; and a rolling motion reducing apparatus described in any of the above paragraphs configured to be provided on the ship body.

In the ship, the rolling motion reducing apparatus may be provided such that a gimbal shaft is parallel to a pitch axis direction of the ship body.

An operation method of a rolling motion reducing apparatus of a ship of the present invention includes: providing a ship. Here, the ship includes: a ship body, and a rolling motion reducing apparatus configured to be provided on the ship body. The rolling motion reducing apparatus includes: a flywheel, a gimbal, a gimbal supporting section, a damper, and a lock mechanism. The gimbal rotatably supports the flywheel. The gimbal supporting section supports the gimbal through a gimbal shaft such that the gimbal can rotate. The damper brakes a rotational motion of the gimbal. The lock mechanism locks a rotational motion of the gimbal. The operation method of a rolling motion reducing apparatus further includes: rotating the flywheel; and locking a rotational motion of the gimbal by using the lock mechanism when the gimbal is swung by the rotation of the flywheel and a rotational motion of the ship body.

According to the present invention, the rolling motion reducing apparatus which can stop urgently in a short period of time and the ship using the same can be provided. In addition, according to the present invention, the rolling motion reducing apparatus which can further improve its safety and the ship using the same can be provided. Furthermore, according to the present invention, the rolling motion reducing apparatus which can easily confirm its rolling motion reducing effect and the ship using the same can be provided.

BRIEF DESCRIPTION OF DRAWINGS

The above and other objects, advantages and features of the present invention will be more apparent from the following description of certain embodiments taken in conjunction with the accompanying drawings, in which.

DESCRIPTION OF EMBODIMENTS

A rolling motion reducing apparatus and a ship using the same according to an embodiment of the present invention will be described below referring to the accompanying drawings.

First, the configurations of the rolling motion reducing apparatus and the ship using the same according to the present embodiment will be described.

Figure 1:
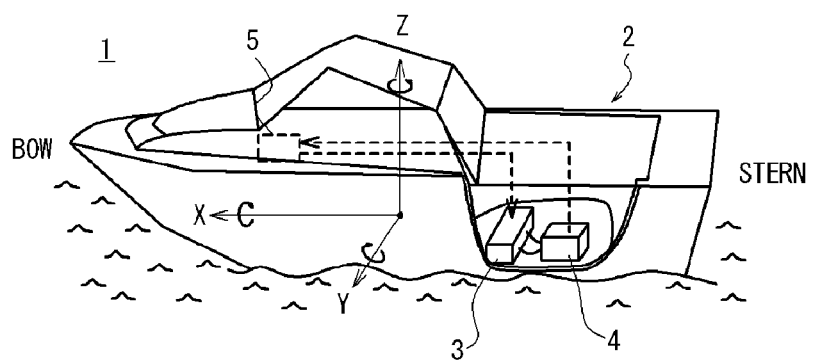
FIG. 1 is a schematic diagram illustrating a configuration of a ship using a rolling motion reducing apparatus according to the present embodiment.

FIG. 1 is a schematic diagram illustrating the configuration of the ship using the rolling motion reducing apparatus according to the present embodiment. Here, a boat is shown as an example of a ship 1. However, the rolling motion reducing apparatus according to the present embodiment can be applied to not only a boat but also other kinds of ships, by changing its size and arrangement corresponding to a kind of ship. The ship 1 includes: a ship body 2, a rolling motion reducing apparatus 3, a generator 4, and a control device 5.

The rolling motion reducing apparatus 3 is installed in the ship body 2 and fixed inside the ship body 2. The rolling motion reducing apparatus 3 is an antirolling system which suppresses a rolling motion of the ship body 2. The detail will be described below. The generator 4 is installed in the ship body 2 and supplies electric power to the rolling motion reducing apparatus 3. The control device 5 is an information processing device such as a computer, receives electric power from, for example, the generator 4 and controls an operation of the rolling motion reducing apparatus 3 based on a user operation or instructions from software. Since the ship 1 has the above configuration, the operation and effect of the rolling motion reducing apparatus 3, which will be described below, can be attained.

Figure 2A:
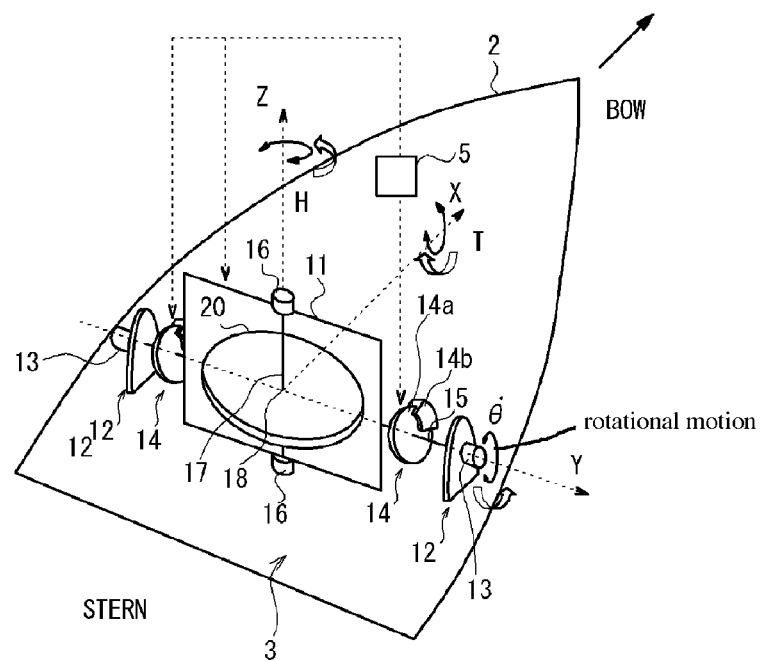
FIG. 2A is a schematic diagram illustrating a configuration example of the rolling motion reducing apparatus according to the present embodiment.

FIG. 2A is a schematic diagram illustrating a configuration example of the rolling motion reducing apparatus according to the present embodiment. Here, for easily understanding of the configuration, the generator 4 is omitted in this figure. The rolling motion reducing apparatus 3 includes a flywheel 20, a gimbal 11, gimbal supporting sections 12, dampers 13 and lock mechanisms 14.

The flywheel 20 is installed inside the gimbal 11. The gimbal 11 supports the flywheel 20 such that the flywheel 20 can rotate around a rotation axis 17. Thus, the flywheel 20 is driven by a motor 16 mounted on the gimbal 11 so as to rotate around the rotation axis 17. The control device 5 controls the rotation of the flywheel 20 by controlling the supply of electric power from the generator 4 to the motor 16.

The gimbal supporting section 12 supports the gimbal 11 through a gimbal shaft 15 such that the gimbal 11 can swing around the gimbal shaft 15. The damper 13 brakes the rotational motion of the gimbal 11 through the gimbal shaft 15. A braking mechanism using fluid resistance of hydraulic oil and another braking mechanism such as a disk brake are examples of the damper 13.

The lock mechanism 14 locks the rotational motion of the gimbal 11 (or gimbal operation). That is, the lock mechanism 14 brings the rotational motion of the gimbal 11 (or gimbal operation) to a complete stop in a very short period of time, and retains the stop state. A mechanism using a disk brake and a mechanism using an actuator are examples of the lock mechanism 14. The mechanism using the disk brake is a mechanism in which a brake disk is mounted on the gimbal shaft 15 of the gimbal 11, and the rotational motion of the gimbal 11 is locked by stopping the rotation of the brake disk by using a brake pad, that is, by stopping the rotation of the gimbal shaft 15. The mechanism using the actuator is a mechanism in which an actuator using hydraulic pressure, pneumatic pressure or electric operation is connected to a main body (a housing containing the flywheel 20) of the gimbal 11, and the rotational motion of the gimbal 11 is locked by stopping the rotational motion of the main body of the gimbal 11 by applying a load to the main body. These lock mechanisms operate only at the lock operation in order not to disturb other usual functions of the rolling motion reducing apparatus 3. The control device 5 controls the operation of the lock mechanism 14 by controlling the supply of electric power from the generator 4 to the lock mechanism 14.

This figure schematically shows an example of the lock mechanism 14 which locks the rotational motion by using the disk brake. Specifically, as the lock mechanism 14, the disk brake is used, which includes: a brake disk 14a configured to be mounted on the gimbal shaft 15 of the gimbal 11; and a driving section 14b (containing a pad, a piston and a caliper) configured to lock the motion of the brake disk 14a. Consequently, the lock mechanism 14 can lock the rotational motion of the gimbal shaft 15, thereby locking the rotational motion of the gimbal 11. Depending on the strength required for the brake, the size of the brake disk 14a and/or the number of the brake disks 14a may be increased. The disk brake is preferable because the configuration is simple, and the manufacture and installation are easy.

In the present embodiment, in addition to the damper 13 for braking, the lock mechanism 14 for urgently stopping is installed in the rolling motion reducing apparatus 3 as a separated element. Consequently, safety device functions for stopping the flywheel 20 can be multiple. As a result, even if the damper 13 malfunctions, the rolling motion reducing apparatus 3 can be stopped safely in a short period of time by the lock mechanism 14. Specifically, since the lock mechanism 14 is specialized for a stopping function, a braking function is not required. Therefore, the configuration can be relatively simplified. Consequently, the apparatus can be miniaturized.

The rolling motion reducing apparatus 3 is arranged such that a rotation center 18 of the flywheel 20 overlaps with a ship centerline of the ship body 2. (However, when two rolling motion reducing apparatuses 3 are arranged, the rotation centers 18 do not overlap with the ship centerline. In this case, the two apparatuses 3 are arranged at positions being equally away from the X axis in the Y direction. Here, the rotation Y axis of the ship body 2 is parallel to each of the rotation axes 15 of the two rolling motion reducing apparatuses 3.) Here, the rotation center 18 of the flywheel 20 is supposed to be the origin, the bow direction is supposed to be the X axis, the vertical direction is supposed to be the Z axis, and the direction perpendicular to the X axis and the Z axis is supposed to be the Y axis. In this case, the rolling motion reducing apparatus 3 is arranged such that the gimbal shaft 15 is perpendicular to the X axis direction. In other words, the rolling motion reducing apparatus 3 is arranged such that the gimbal shaft 15 is parallel to the Y axis direction. Further, the rolling motion reducing apparatus 3 is arranged such that the line of which the gimbal shaft 15 is virtually extended inside the gimbal 11 penetrates through the rotation center 18 of the flywheel 20 (meets the rotation axis 17). Furthermore, the rolling motion reducing apparatus 3 is arranged such that the rotation axis 17 is parallel to the Z axis direction when the ship body 2 is on the still-water surface.

Figure 2B:
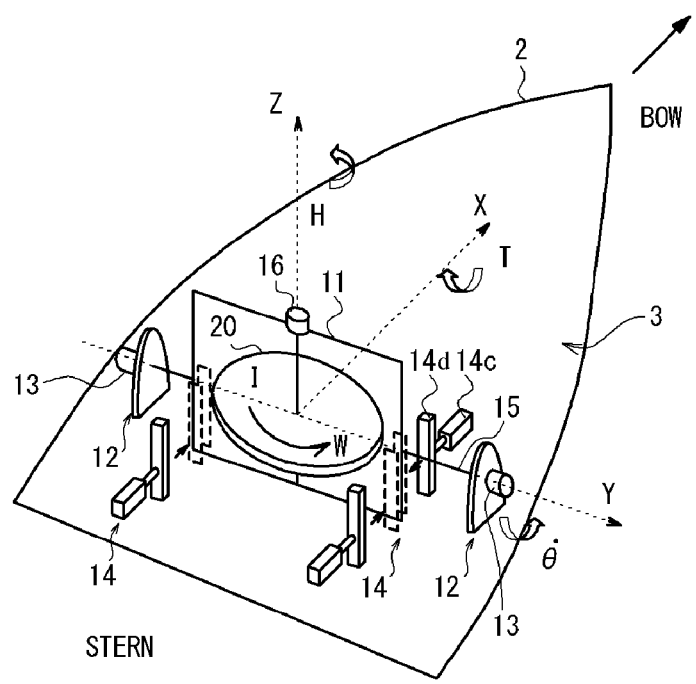
FIG. 2B is a schematic diagram illustrating another configuration example of the rolling motion reducing apparatus according to the present embodiment.

The lock mechanism 14 may be a mechanism using an actuator as described above. FIG. 2B is a schematic diagram illustrating another configuration example of the rolling motion reducing apparatus according to the present embodiment. Here, for easily understanding of the configuration, the generator 4 and the control device 5 are omitted in this figure. This example in this figure differs from the example in FIG. 2A in the point that an actuator is used for the lock mechanism 14. The lock mechanism 14 includes an actuator 14c and a stopper 14d. The actuator 14c is an actuator using hydraulic pressure, pneumatic pressure or electric operation. The stopper 14d is connected to the actuator 14c. The stopper 14d is pressed to the main body of the gimbal 11 by the actuator 14c when the lock mechanism 14 operates. Therefore, the lock mechanism 14 applies a load to the main body of the gimbal 11 to stop the rotational motion, thereby locking the rotational motion of the gimbal 11.

Next, an operation of the rolling motion reducing apparatus and the ship using the same according to the present embodiment will be described.

1. The Rolling Motion Suppressing Operation

The rolling motion reducing apparatus 3 generates the antirolling moment T based on a following principle and functions as the rolling motion reducing apparatus of the ship 1. The flywheel 20 rotates by the rotation of the motor 16. The inertia moment around the Z axis of the rotating flywheel 20 is supposed to be I and the rotation speed is supposed to be $\omega$. Then, the angular momentum H of the flywheel 20 is indicated by a formula (1).

$$H = I \times \omega \quad (1)$$

In this situation, if it is assumed that the flywheel 20 is made to rotate around the Y axis at the rotation speed of $\theta \bullet$, the moment T whose magnitude is indicated by a formula (2) is generated around the X axis.

$$T = H \times \theta \bullet \quad (2)$$

That is, the flywheel 20 tries to rotate around the X axis by the moment T. Here, the relative relationship among the X axis, the Y axis and the Z axis is unchanged.

Figure 3:
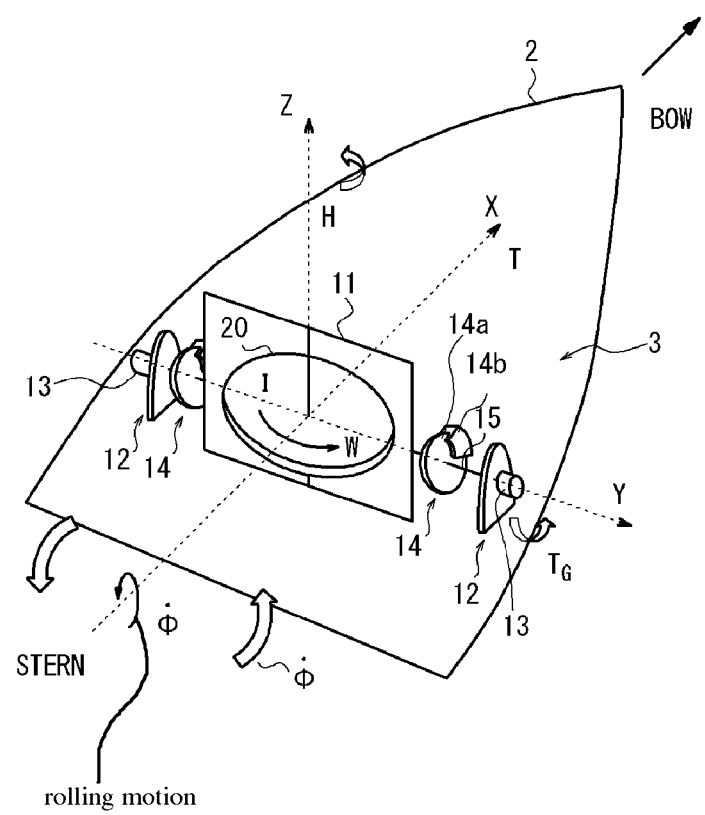
FIG. 3 is a schematic diagram illustrating an operation of the rolling motion reducing apparatus according to the present embodiment.
Figure 4:
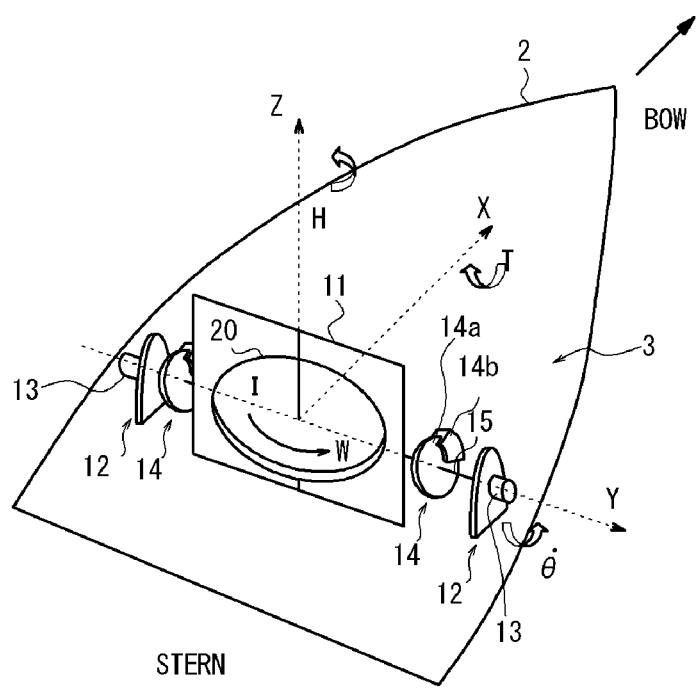
FIG. 4 is a schematic diagram illustrating an operation of the rolling motion reducing apparatus according to the present embodiment.

Next, a principle in which the rotation speed of $\theta \bullet$ around the Y axis is generated at the flywheel 10 will be described. FIGS. 3 and 4 are schematic diagrams illustrating an operation of the rolling motion reducing apparatus according to the present embodiment. Here, the motor 16 and the generator 4 are omitted in this figure. FIG. 3 shows the case in which the ship body 2 is rolled around the X axis at the rotation speed of $\phi \bullet$ listing to port (in the counterclockwise direction when viewed from the stern) by waves. The flywheel 20 is supported by the gimbal 11 in which the gimbal shaft 15 corresponds to the Y axis, and fixed to the ship body 2 through the gimbal supporting section 12. Thus, the flywheel 20 cannot rotate freely around the X axis, and the flywheel 20 rotates around the X axis at the rotation speed of $\phi \bullet$ similarly to the ship body 2. Consequently, based on the principle same as the principle of generating the above moment T, a rotational motion torque $T_G$ indicated by a formula (3) is generated around the Y axis.

$$T_G = H \times \phi \bullet \quad (3)$$

Due to the rotational motion torque $T_G$, the rotation of the flywheel 20 arises. That is, due to the rotational motion torque $T_G$, the flywheel 20 rotates around the Y axis at the rotation speed of $\theta \bullet$. FIG. 4 shows the case in which the flywheel 20 rotates around axis at the rotation speed of $\theta \bullet$. When the flywheel 20 rotates around the Y axis at the rotation speed of $\theta \bullet$, as described above, an operation with respect to the angular momentum H of the flywheel 20, the antirolling moment T ($T = H \times \theta \bullet$) is generated around the X axis. However, since the flywheel 20 is fixed to the ship body 2 by the gimbal 11, the moment T acts on the ship body 2 in a direction against the rolling motion of the ship body 2. As a result, the rolling motion of the ship body 2 is reversed with the moment T and the rolling motion of the ship body 2 is suppressed.

Meanwhile, in the case that the rolling motion of the ship body 2 is opposite to that of the above case, all of the directions are opposite to those of the above case. Thus, the generated moment T is in the direction opposite to that of the above case. Then, in this case, the rolling motion of the ship body 2 is reversed with the moment T and the rolling motion of the ship body 2 is suppressed.

As described above, since the generated moment T always acts on the ship body 2 in the direction opposite to the direction of the rolling motion of the ship body 2 as the antirolling moment, the rolling motion of the ship body 2 is suppressed.

2. Locking Operation

During the above mentioned 1. The rolling motion suppressing operation, it is assumed that the case arises in which the rolling motion operation is desired to be stopped urgently (ex. the confirmation of the effect of the rolling motion reducing apparatus 3, the malfunction of the damper 13). The case arising may be found by the user or may be detected by a sensor (ex. a temperature sensor of the damper 13) not shown in the figures. In the case of the sensor, the detection signal is outputted to the control device 5.

The user or the software operates the lock mechanism 14 through the control device 5. The lock mechanism 14 locks the rotational motion of the gimbal 11 (gimbal operation). In the example of FIGS. 2 to 4, the lock mechanism 14 (disk brake) strongly holds the brake disk 14a mounted on the gimbal shaft 15 by the driving section 14b. Accordingly, the lock mechanism 14 makes the rotation of the brake disk 14a, i.e. the gimbal shaft 15 stop. Consequently, the rotational motion operation of the gimbal 11 stops in a very short period of time (stops urgently).

As described above, during the rotational motion suppressing operation, the rotational motion operation of the gimbal 11 can stop urgently.

As described above, the rolling motion reducing apparatus 3 of the present invention has the lock mechanism 14. By using the lock mechanism 14, when the damper 13 brakes down, regardless of the phase of the gimbal 11 which is in the rotational motion, the rotational motion operation of the gimbal 11 can be locked. Consequently, even if the damper 13 brakes down, the rolling motion reducing apparatus 3 can avoid damage.

Furthermore, by urgently stopping the rotational motion operation of the gimbal 11 of the rolling motion reducing apparatus 3 on the sea, the function of the rolling motion reducing apparatus 3 can be stopped. Therefore, under the almost equivalent wave condition, the situation of the ship 1 when the rolling motion reducing apparatus 3 is in the ON state can be compared with the situation of the ship when the rolling motion reducing apparatus 3 is in the OFF state. Consequently, the effect of the rolling motion reducing apparatus 3 can be confirmed.

Moreover, in the present embodiment, since the damper 13 and the lock mechanism 14 are provided separately, even if the damper 13 brakes down, the rolling motion reducing apparatus 3 can be made to stop more safely by using the lock mechanism 14. Consequently, the rolling motion reducing apparatus 3 can be an apparatus safer than before.

Incidentally, the rolling motion reducing apparatus of the present invention can also be used for reducing the rolling motion of a gondola, a ropeway, a monorail and a suspended load of a crane rather in addition to a ship.

It is apparent that the present invention is not limited to the above embodiments, but may be modified and changed without departing from the scope and spirit of the invention.

Although the present invention has been described above in connection with several embodiments thereof, it would be apparent to those skilled in the art that those embodiments are provided solely for illustrating the present invention, and should not be relied upon to construe the appended claims in a limiting sense.

The invention claimed is:

1. A rolling motion reducing apparatus for a ship, the rolling motion reducing apparatus comprising:
   a flywheel;
   a gimbal that rotatably supports said flywheel;
   a gimbal supporting section that supports said gimbal through a gimbal shaft such that said gimbal can rotate;
   a damper that brakes a swinging motion of said gimbal;
   a lock mechanism that is provided as a separate element from said damper and that locks the swinging motion of said gimbal; and
   a control device that controls said lock mechanism to urgently stop the swinging motion of said gimbal in response to a user operation or a detection signal, wherein
   said damper is a braking mechanism including hydraulic oil to provide fluid resistance to brake the swinging motion of said gimbal, and
   said lock mechanism includes one of (1) a disk brake mounted on said gimbal shaft and a driving section configured to lock a rotational motion of said disk brake such that the swinging motion of said gimbal is urgently stopped, and (2) a stopper and an actuator configured to press said stopper against said gimbal such that the swinging motion of said gimbal is urgently stopped and said gimbal is locked.

2. The rolling motion reducing apparatus according to claim 1, wherein said lock mechanism includes (1) said disk brake and said driving section.

3. The rolling motion reducing apparatus according to claim 1, wherein said lock mechanism includes (2) said stopper and said actuator.

4. The rolling motion reducing apparatus according to claim 1, wherein said control device controls said lock mechanism to urgently stop the swinging motion of said gimbal when said damper malfunctions.

5. A ship comprising:
   a ship body; and
   a rolling motion reducing apparatus provided on said ship body,
   wherein said rolling motion reducing apparatus comprises:
   a flywheel,
   a gimbal that rotatably supports said flywheel,
   a gimbal supporting section that supports said gimbal through a gimbal shaft such that said gimbal can rotate,
   a damper that brakes a swinging motion of said gimbal,
   a lock mechanism that is provided as a separate element from said damper and that locks the swinging motion of said gimbal, and
   a control device that controls said lock mechanism to urgently stop the swinging motion of said gimbal in response to a user operation or a detection signal, wherein
   said damper is a braking mechanism including hydraulic oil to provide fluid resistance to brake the swinging motion of said gimbal, and
   said lock mechanism includes one of (1) a disk brake mounted on said gimbal shaft and a driving section configured to lock a rotational motion of said disk brake such that the swinging motion of said gimbal is urgently stopped, and (2) a stopper and an actuator configured to press said stopper against said gimbal such that the swinging motion of said gimbal is urgently stopped and said gimbal is locked.

6. The ship according to claim 5, wherein said lock mechanism includes (1) said disk brake and said driving section.

7. The ship according to claim 5, wherein said lock mechanism includes (2) said stopper and said actuator.

8. The ship according to claim 5, wherein said control device controls said lock mechanism to urgently stop the swinging motion of said gimbal when said damper malfunctions.

9. An operation method of a rolling motion reducing apparatus of a ship, the operation method comprising:
providing a ship including:
a ship body, and
a rolling motion reducing apparatus provided on the ship body,
wherein the rolling motion reducing apparatus includes:
a flywheel,
a gimbal that rotatably supports the flywheel,
a gimbal supporting section that supports the gimbal through a gimbal shaft such that the gimbal can rotate,
a damper that brakes a swinging motion of said gimbal,
a lock mechanism that is provided as a separate element from the damper and locks the swinging motion of the gimbal, and
a control device that controls the lock mechanism to urgently stop the swinging motion of the gimbal in response to a user operation or a detection signal,
rotating the flywheel;
braking the swinging motion of the gimbal with the damper; and
controlling the lock mechanism, with the control device, to urgently stop the swinging motion of the gimbal in response to the user operation or the detection signal, wherein
the damper is a braking mechanism including hydraulic oil to provide fluid resistance to brake the swinging motion of the gimbal, and
the lock mechanism includes one of (1) a disk brake mounted on the gimbal shaft and a driving section configured to lock a rotational motion of the disk brake such that the swinging motion of the gimbal is urgently stopped, and (2) a stopper and an actuator configured to press the stopper against the gimbal such that the swinging motion of the gimbal is urgently stopped and the gimbal is locked.

10. The operation method of a rolling motion reducing apparatus of a ship, according to claim 9, wherein
the locking mechanism includes (1) the disk brake and the driving section.

11. The operation method of a rolling motion reducing apparatus of a ship, according to claim 9, wherein
the lock mechanism includes (2) the stopper and the actuator.

12. The operation method of a rolling motion reducing apparatus of a ship, according to claim 9, wherein said controlling of the lock mechanism comprises controlling the lock mechanism, with the control device, to urgently stop the swinging motion of the gimbal when the damper malfunctions.

* * * * *